US011074616B2

(12) United States Patent
Catalano et al.

(10) Patent No.: US 11,074,616 B2
(45) Date of Patent: Jul. 27, 2021

(54) PREDICTIVE MEDIA CONTENT DELIVERY

(71) Applicant: International Business Machines Corporation, Armonk, NY (US)

(72) Inventors: Pasquale A. Catalano, Wallkill, NY (US); Andrew G. Crimmins, Montrose, NY (US); Arkadiy O. Tsfasman, Wappingers Falls, NY (US); John S. Werner, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 15/922,232

(22) Filed: Mar. 15, 2018

(65) Prior Publication Data

US 2019/0287136 A1 Sep. 19, 2019

(51) Int. Cl.
*G06Q 30/02* (2012.01)

(52) U.S. Cl.
CPC ..... *G06Q 30/0264* (2013.01); *G06Q 30/0261* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 6,233,858 B1 | 5/2001 | Brach, Jr. et al. | |
| 7,107,231 B1 * | 9/2006 | Hall | G06Q 30/02 705/14.27 |
| 10,269,082 B2 * | 4/2019 | Morris | B67D 7/14 |
| 2009/0211663 A1 | 8/2009 | Olesen et al. | |
| 2011/0226854 A1 | 9/2011 | Stoudt et al. | |
| 2011/0282727 A1 | 11/2011 | Han et al. | |
| 2011/0296287 A1 * | 12/2011 | Shahraray | H04L 67/18 715/202 |
| 2012/0254142 A1 * | 10/2012 | Knowlton | G06T 11/206 707/705 |
| 2014/0006151 A1 * | 1/2014 | Grigg | G06Q 20/20 705/14.53 |
| 2014/0095318 A1 | 4/2014 | Hradetzky | |
| 2014/0122137 A1 * | 5/2014 | Nelson | G06Q 30/0201 705/7.11 |
| 2014/0129426 A1 * | 5/2014 | Lamb | G06Q 20/4016 705/39 |
| 2015/0066621 A1 * | 3/2015 | Kakarlapudi | G06Q 30/0255 705/14.25 |
| 2015/0106204 A1 * | 4/2015 | Pudar | G06Q 30/0269 705/14.58 |

(Continued)

*Primary Examiner* — Eric R Netzloff
(74) *Attorney, Agent, or Firm* — Cantor Colburn LLP; Teddi Maranzano

(57) ABSTRACT

Examples of techniques for predictive media content delivery are disclosed. In one example implementation according to aspects of the present disclosure, a computer-implemented method for predictive media content delivery includes identifying, by the processing device, a customer approaching a kiosk. The method further includes determining, by the processing device, an estimated duration that the customer is expected to be in proximity to the kiosk. The method further includes presenting, by the processing device, media content to the customer that has a playback duration commensurate with the estimated duration that the customer is expected to be in proximity to the kiosk.

12 Claims, 6 Drawing Sheets

(56) References Cited

U.S. PATENT DOCUMENTS

| | | |
|---|---|---|
| 2017/0308964 A1 | 10/2017 | Morris et al. |
| 2018/0029869 A1* | 2/2018 | Carapelli .............. G07F 13/025 |
| 2019/0069019 A1* | 2/2019 | Hsu ................... H04N 21/4305 |
| 2019/0106317 A1* | 4/2019 | Sahota ................... G06Q 30/06 |
| 2019/0251365 A1* | 8/2019 | Salman ................. G06Q 20/18 |
| 2020/0402130 A1* | 12/2020 | Landers, Jr. ......... G07G 1/0072 |

\* cited by examiner

PREDICTIVE MEDIA CONTENT DELIVERY

BACKGROUND

The present invention generally relates to data processing systems, and more specifically, to predictive media content delivery.

Consumers of media content (e.g., audio, video, print, etc.) consume media content in a variety of ways. For example, consumers watch videos on televisions, smartphones, advertising displays, and the like. Media content can include or contain advertisements (i.e., commercials), which can be used to promote or sell a product or service. For example, an advertiser creates a commercial to promote its product(s) or service(s) and pays to have the commercial presented through various outlets such as television, radio, newspapers, periodicals, websites, etc. Consumers of the media are then exposed to the commercial. It is useful to present information relevant to consumers and in a manner easily consumed.

SUMMARY

Embodiments of the present invention are directed to a computer-implemented method for predictive media content delivery. A non-limiting example of the computer-implemented method includes identifying, by the processing device, a customer approaching a kiosk. The method further includes determining, by the processing device, an estimated duration that the customer is expected to be in proximity to the kiosk. The method further includes presenting, by the processing device, media content to the customer that has a playback duration commensurate with the estimated duration that the customer is expected to be in proximity to the kiosk.

Additional embodiments of the present invention are directed to a system. A non-limiting example of the system includes a memory comprising computer readable instructions and a processing device for executing the computer readable instructions for performing a method for predictive media content delivery as described herein.

Additional embodiments of the invention are directed to a computer program product. A non-limiting example of the computer program product includes a computer readable storage medium having program instructions embodied therewith. The program instructions are executable by a processor to cause the processor to perform a method for predictive media content delivery as described herein.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
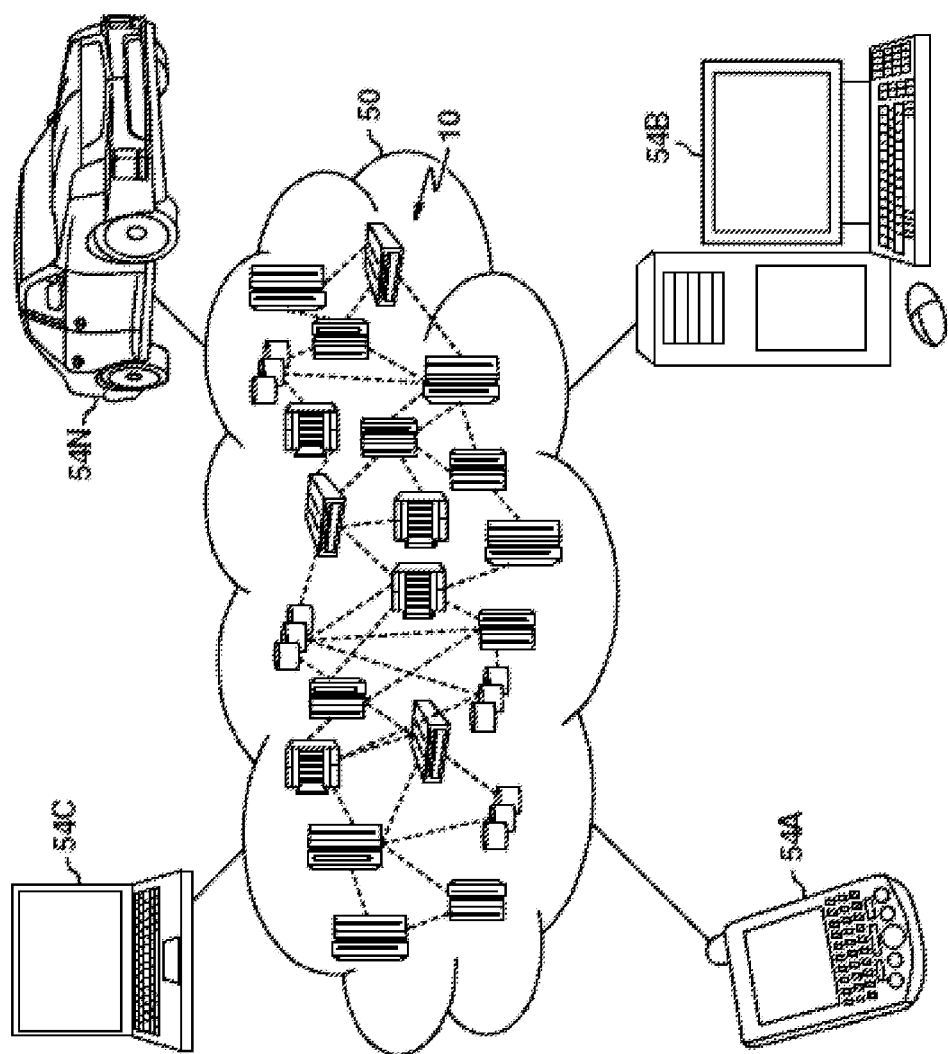
FIG. 1 depicts a cloud computing environment according to aspects of the present disclosure.

The diagrams depicted herein are illustrative. There can be many variations to the diagrams or the operations described therein without departing from the spirit of the disclosure. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
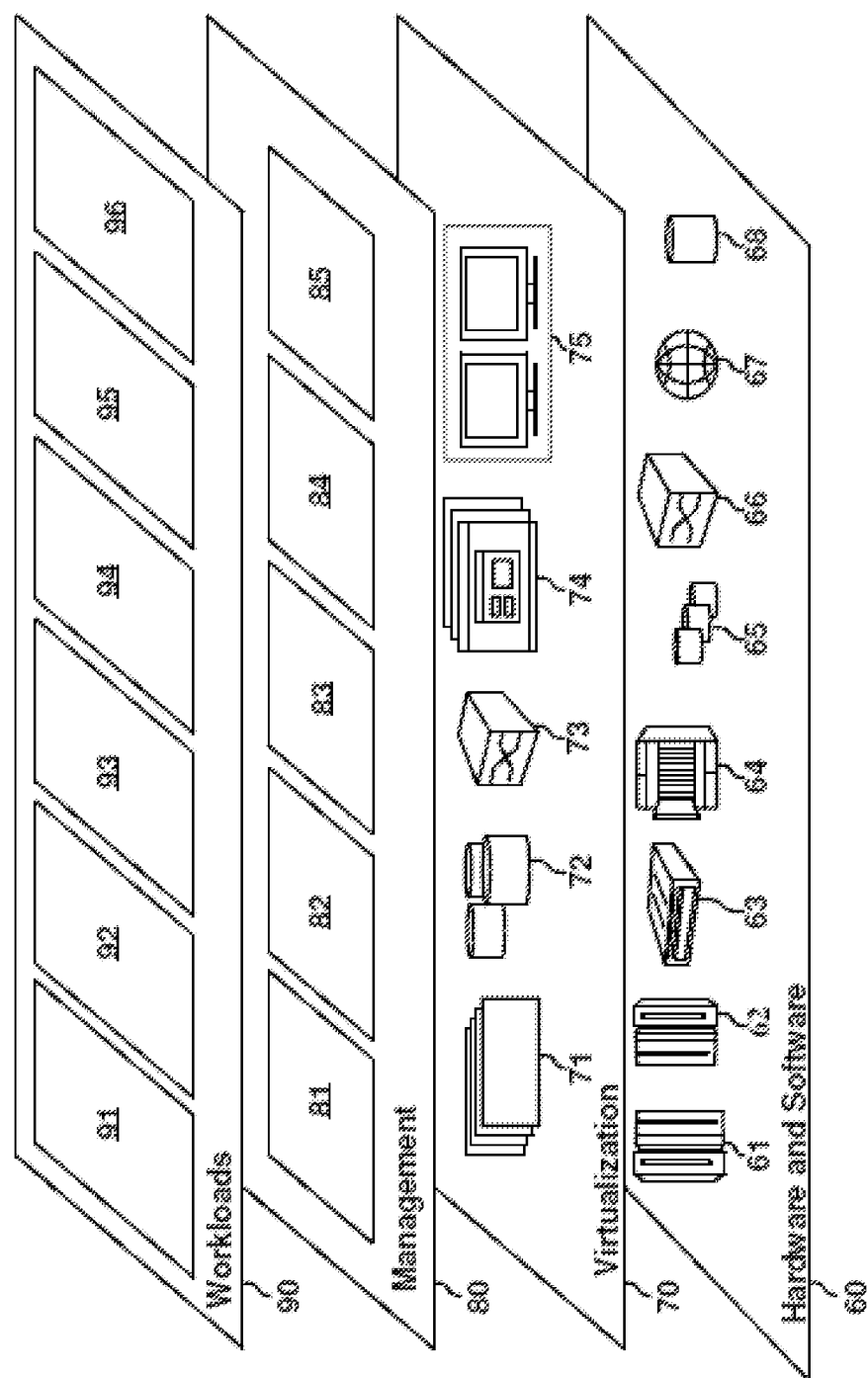
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive media content delivery 96.

Figure 3:
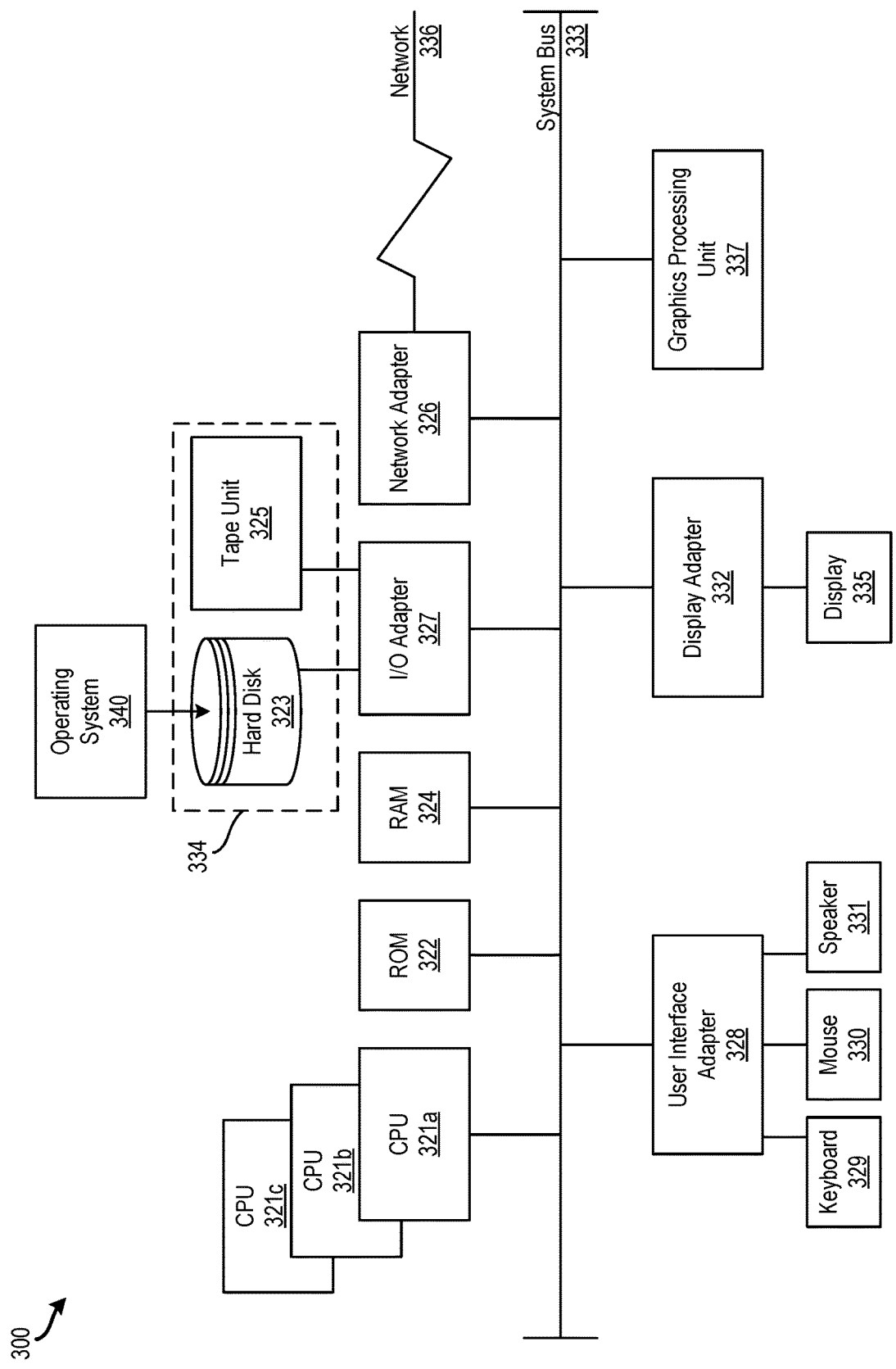
FIG. 3 depicts a block diagram of a processing system for implementing the techniques described herein according to aspects of the present disclosure.

It is understood that the present disclosure is capable of being implemented in conjunction with any other type of computing environment now known or later developed. For example, FIG. 3 illustrates a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further illustrated are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 30, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in the processing system 300.

Turning now to an overview of technologies that are more specifically relevant to aspects of the present disclosure, techniques are provided for predictive media content delivery to provide media content that is relevant to consumers and in a manner easily consumed. Many kiosks, for example, contain media content delivery equipment, such as audio speakers and video displays. As one such example, a fuel station pump kiosk may be equipped with media delivery equipment to deliver content to a consumer while the consumer is fueling his vehicle. Media that is currently displayed at a fuel station pump kiosk is generally a fixed loop of media content that either might be repeated multiple times on a long fuel-up or may not completely loop through a single cycle on a short fuel-up. The amount of time spent at the pump filling a vehicle can depend on various factors such as vehicle fuel tank size, pump flow rate of the fuel pump (i.e., the pump that pumps fuel into the vehicle's fuel tank from a fuel storage tank), ambient temperature, fueling habits of the consumer, and the like. Additionally, such media content is not targeted towards specific consumers and therefore may not be relevant to various consumers.

Turning now to an overview of the aspects of the disclosure, one or more embodiments address the above-described shortcomings of the prior art by providing predicting an amount of time a consumer will spend exposed to media content and selectively presenting media content to the consumer based on the predicted time. For example, a customer (or any other person or consumer) who is approaching a kiosk is identified, an estimated duration that the customer is expected to be in proximity to the kiosk is determined, and media content is presented to the customer, the media content being a playback duration commensurate with the estimated duration of the media content. Moreover, the present techniques present media content customized to the user based on a user profile. This enables media content to be presented that may be of interest or otherwise relevant to the consumer.

The above-described aspects address the shortcomings of the prior art by presenting media content to a consumer that is commensurate in duration with an estimated duration that the customer is expected to be in proximity to a kiosk at which the media content is presented. This enables content to be delivered to a consumer with the expectation that the content can be fully consumed before the user leaves the proximity of the kiosk.

Figure 4:
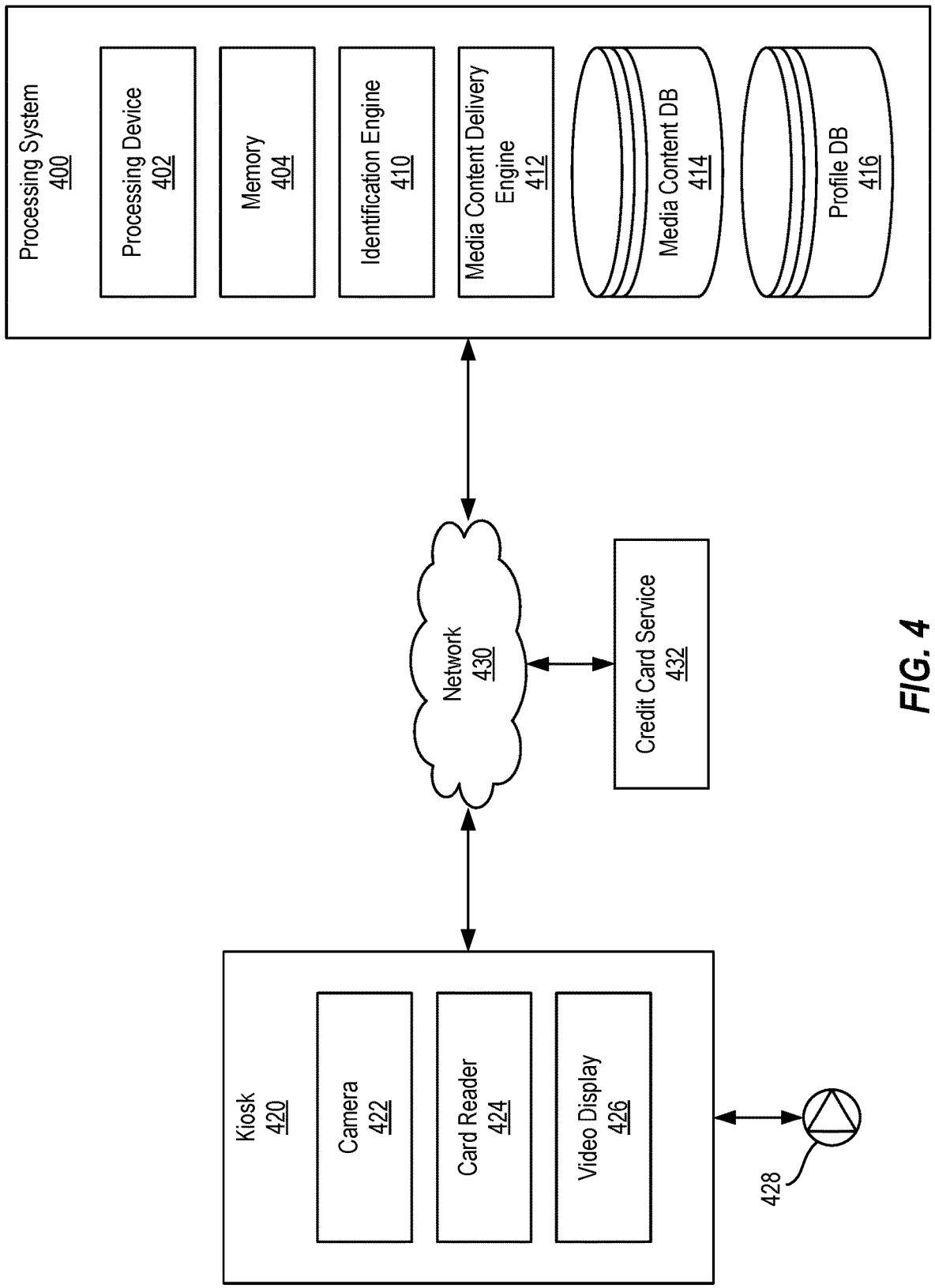
FIG. 4 depicts a block diagram of a processing system for predictive media content delivery, according to aspects of the present disclosure.

FIG. 4 depicts a block diagram of a processing system 400 for predictive media content delivery, according to aspects of the present disclosure. The processing system 400 includes a processing device 402, a memory 404, an identification engine 410, a media content delivery engine 412, a media content database 414, and a profile database 416. The kiosk 420 can include a camera 422 (which may be part of the kiosk 420 or can be located near the kiosk 420), a card reader 424, and a video display 426. According to aspects of the present disclosure, the kiosk 420 can also include a speaker or other audio output (e.g., to play a radio commercial, a user's favorite song, etc.). This can be used both for advertising and to entice a user to remain at the kiosk 420 longer, which may help a business where the kiosk is located.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. For example, the programming can be processor executable instructions stored on a tangible memory (e.g., the memory 404), and the hardware can include the processing device 402 for executing those instructions. Thus a system memory (e.g., the memory 404) can store program instructions that when executed by the processing device 402 implement the engines described herein. Other engines can also be utilized to include other features and functionality described in other examples herein.

The processing system 400 can also include a network adapter (not shown) (e.g., the network adapter 326) that connects the processing system 400 to a network 430 (e.g., the outside network 336). The network 430 can be any suitable network, such as a local area network, a wide area network, the Internet, or another suitable network. The processing system 400 is, therefore, able to communicate with other systems such as a kiosk 420 and/or a credit card service 432. It should be appreciated that the connections shown between and among the processing system 400, the network 430, the kiosk 420, and the credit card service 432 can be wired and/or wireless connections and can be direct (e.g., peer-to-peer) and/or indirect (e.g., via routers, switches, access points, hubs, etc.).

The identification engine 410 identifies a customer (or other person or consumer) approaching a kiosk 420 (e.g., a point of sale kiosk, a fuel station pump kiosk, a ticketing kiosk, an electric vehicle recharging station, etc.). To do this, the identification engine 410 can utilize video imaging using images captured by the camera 422 of the kiosk 420, data captured by a card reader 424 of the kiosk, or other identification procedures. For example, the customer can enter a customer number or other customer identifier, such as by swiping or entering a customer loyalty card, rewards card, payment card and the like using the card reader 424, using a number pad (not shown), using a barcode reader (not shown), using the camera 422, or using another suitable device. According to an example, the customer can swipe or otherwise enter credit card information, which can be transmitted to the credit card service 432 to identify the customer. The identification engine 410 can use the identifier of the customer to access a profile database 416 that contains information associated with the customer.

The identification engine 410 can also identify a vehicle associated with the customer, by techniques such as video imaging. For example, the identification engine 410 can utilize images captured by the camera 422 of the kiosk 420 to identify a type, make, model, etc., of the vehicle. The identification engine 410 can reference a database of vehicles, which can be the profile database 416 or another suitable database, to determine vehicle information such as the size of the fuel tank for different makes and models of vehicles. The vehicle can also be identified based on the customer. For example, the profile database 416 can indicate what type of vehicle a particular customer owns/drives.

The profile database 416 can include customer information, such as age, gender, interests, past purchases, previous time spent at kiosks, previous tank quantity when the customer previously filled up at a gas station kiosk, previous media content viewed, etc. The profile database 416 can also include data indicating what type of vehicle a particular customer owns/drives. Accordingly, the vehicle can be identified based on the customer who is identified.

The media content delivery engine 412 uses user profile data stored in the profile database 416, as well as information such as pump flow rate of a fuel pump (e.g., the pump 428), fuel pump tank quality, temperature, etc. to estimate how long the user will be at the kiosk 420. Based on this determined estimate, the media content delivery engine 412 selects media content from the media content database 414 to present to the user.

In addition to identifying the customer, the credit card service 432 can provide data to the media content delivery engine 412 that includes recent purchases of the customer, which can be used to select media content that may be of particular relevance to the customer. For example, if the customer recently purchased skiing equipment, the media content delivery engine 412 might select an advertisement for a ski resort or a highlight video of a recent ski competition. This enables customer-specific content to be delivered to the customer, which improves the usefulness of the media content to the customer.

Figure 5:
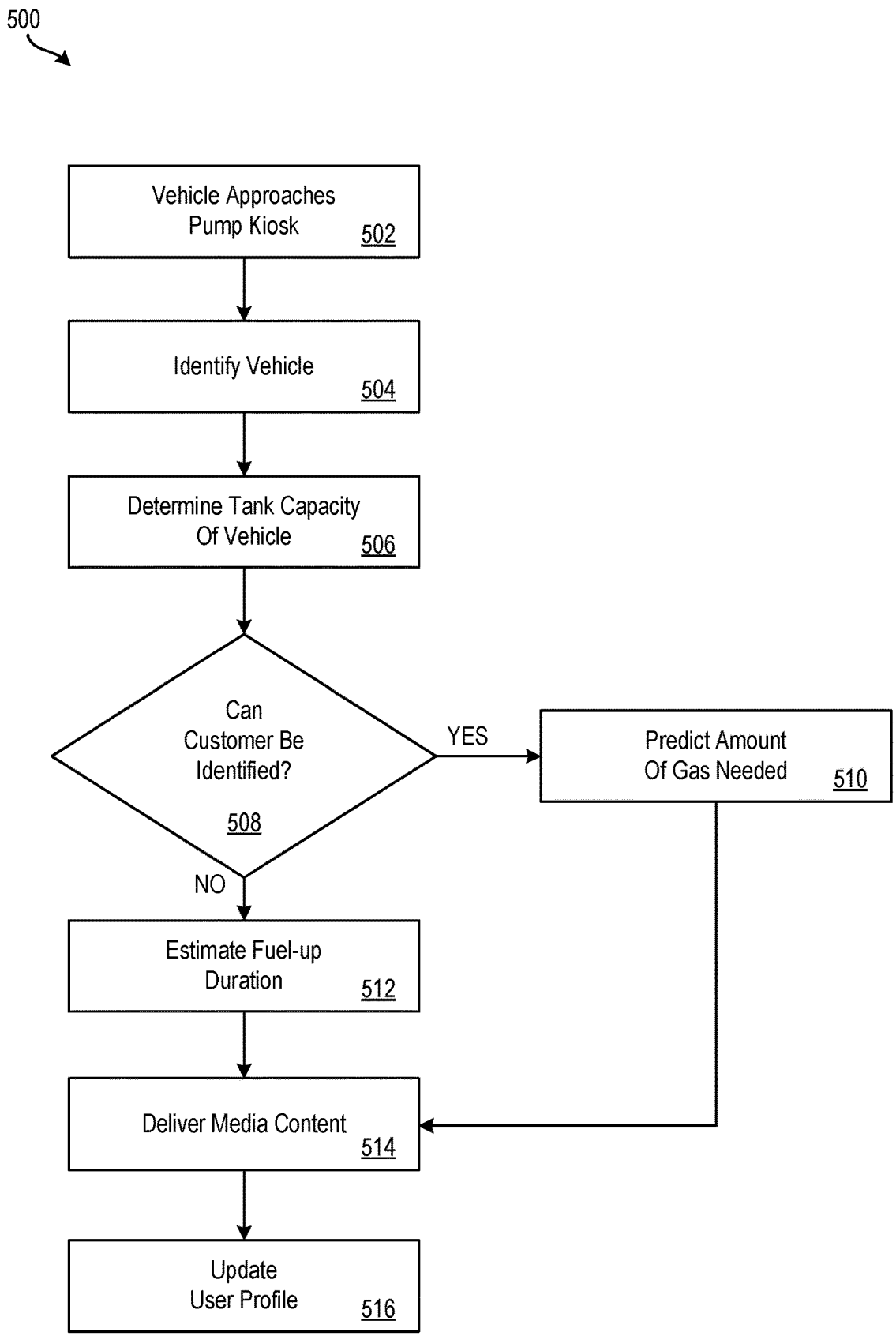
FIG. 5 depicts a flow diagram of a method for predictive media content delivery, according to aspects of the present disclosure.

FIG. 5 depicts a flow diagram of a method 500 for predictive media content delivery, according to aspects of the present disclosure. The method 500 can be performed by any suitable processing system (e.g., the processing system 300, the processing system 400) or processing device (e.g., the processor 321, the processing device 402).

At block 502, a vehicle approaches a pump kiosk (e.g., the kiosk 420) to fuel a vehicle using a pump (e.g., the pump 428). The identification engine 410 identifies the vehicle at block 504. In particular, at block 504, an image or video is captured by the camera 422 and is analyzed using image or video recognition techniques (e.g., IBM® WATSON visual recognition API) to identify the make and model of the vehicle. If a specific model cannot be determined, average car size and/or type can be used (e.g., economy, compact, SUV, minivan, truck, etc.). The video/image recognition techniques can alternatively or additionally identify a vehicle by extracting the license plate number, vehicle identifier number (VIN) or another visual identifier. In some examples, the vehicle transmits its information (e.g., make, model, tank size, etc.) using known communication techniques (e.g., Bluetooth, RFID, NFC—Near Field Communication, dedicated short-range communication, Wi-Fi, etc.) to the kiosk 420 and/or the processing system 400.

The identification engine 410 determines (or estimates) a tank capacity of the vehicle at block 506 using the vehicle identification at block 504. At decision block 508, the identification engine 410 determines whether the customer (e.g., the driver of the vehicle) can be identified and, if so, it identifies the customer and predicts the amount of fuel needed at block 510. The customer can be identified in a variety of ways, for example, by the customer's credit/debit card, by the customer's rewards/loyalty card, via facial recognition using the camera 422, from the user's license plate number (or another identifier), via proximity of the user's mobile device (e.g., smart phone) to the kiosk 420 (e.g., distance measurements via Bluetooth, Wi-Fi, NFC, short range directed wireless signals that cover a small distance in front of the kiosk 420), and the like. A customer profile stored in the profile database 416 can contain average fill-up quantity (e.g., the customer fills his vehicle when the fuel tank is about half empty, the customer fills his vehicle when the tank is almost empty, etc.).

If the customer cannot be identified at decision block 508, the method 500 continues to block 512, and the identification engine 410 estimates a fuel-up duration (e.g., by referencing vehicle information stored in a database). For example, age, gender, and other preferences or information about the user can be used to make an educated guess on fuel-up duration since the customer could not be identified at block 508. Customer preferences/interests can be populated by the customer or populated based on the use of the customer's rewards/loyalty card, credit/debit card (e.g., based on previous purchases), etc. to provide customer-specific content. According to aspects of the present disclosure, it is possible to save extracted information from an unidentified user such that it could be recalled if the same customer returns. The data can be maintained for some threshold period of time (e.g., 3 months) or indefinitely. If the user does not return within the threshold time (i.e., user was not a local and was passing through), the data can be deleted. If the gas station or the kiosk (e.g., the kiosk 420) happens to be a chain (i.e., multiple locations), the data can be shared with other locations/kiosks.

Once the fuel-up duration is determined at block 510 or 512, the media delivery engine 412 delivers media content at block 514 by displaying on a display (e.g., the video display 426) media content based on the estimated fuel-up duration. For example, based on the customer profile and expected fill-up quantity, the media content delivery engine 412 estimates the quantity of gas required and the total time necessary to fill the tank as well as additional time duration that the customer spends at the kiosk 420 (e.g., a particular customer may be faster or slower than another, some customers may wash their windshield, etc.). To estimate the total time necessary to fill the tank, pump flow rate of the pump 428, the current capacity of the underground fuel storage tank that supplies the pump (not shown), current temperature, and pump age can be used.

With the amount of time that the customer will spend at the kiosk 420 estimated, media content may be selected from the media content database 414 that is prioritized and targeted towards the customer and fits the estimated fill-up duration. In this way, media content is displayed that is a suitable duration to be consumed by the customer in a period of time commensurate with the fuel-up duration. For example, if the fuel-up duration is 75 seconds, media content that is approximately 75 seconds in duration is displayed. In some examples, multiple shorter media content can be shown sequentially for a combined duration commensurate with the fuel-up duration (e.g., three 15-second media content for a 45-second fuel-up duration).

At block 516, a user profile stored in the profile database 416 is updated. For example, when fueling is finished, the processing system 400 can update the customer profile stored in the profile database 416 with information about the amount of time the customer was at the kiosk 420 along with which media content was delivered. In some examples, video/image recognition can be used to determine if the customer watched/listened to the media and the customer's reaction thereto can also be captured.

Additional processes also may be included, and it should be understood that the processes depicted in FIG. 5 represent an illustration, and that other processes may be added or existing processes may be removed, modified, or rearranged without departing from the scope and spirit of the present disclosure.

Figure 6:
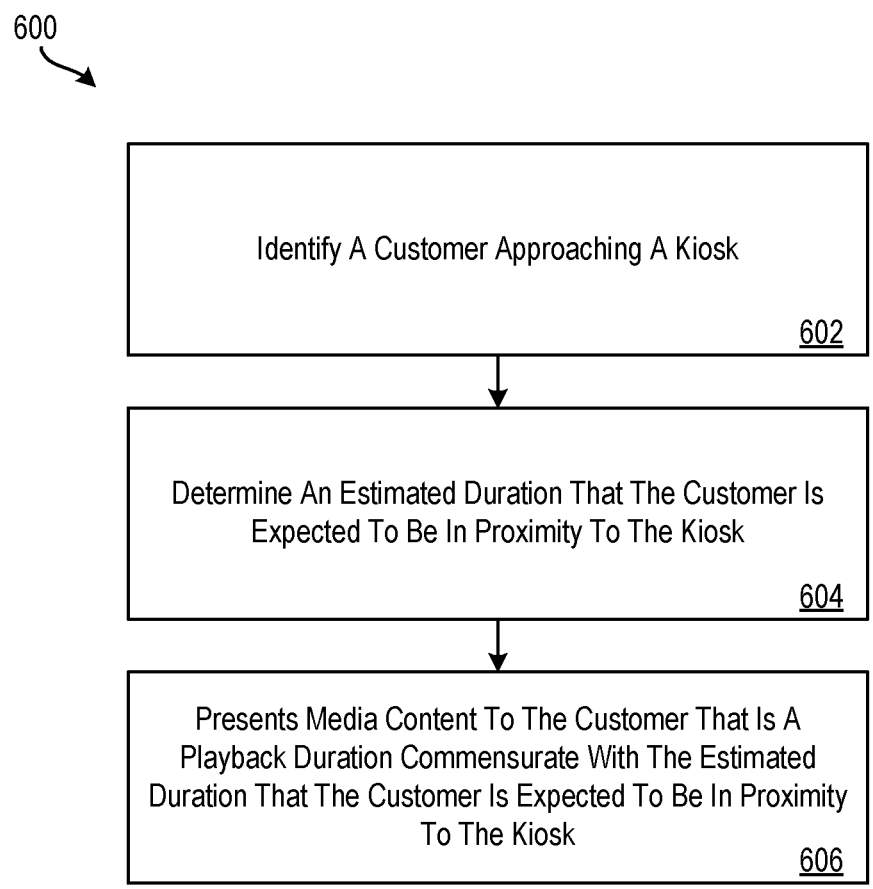
FIG. 6 depicts a flow diagram of a method for predictive media content delivery, according to aspects of the present disclosure.

FIG. 6 depicts a flow diagram of a method for predictive media content delivery, according to aspects of the present disclosure. The method 600 can be performed by any suitable processing system (e.g., the processing system 300, the processing system 400) or processing device (e.g., the processor 321, the processing device 402).

At block 602, the identification engine 410 identifies a customer approaching a kiosk. The kiosk can be, for example, a fuel kiosk that includes a fuel pump. Identifying the customer can include identifying the customer using an identifier associated with the customer, wherein the identifier is stored in the profile database 416.

At block 604, the media content delivery engine 412 determines an estimated duration that the customer is expected to be in proximity to the kiosk. In in an example in which the kiosk is a fuel kiosk, determining the estimated duration includes determining an estimated fuel-up time for a vehicle associated with the customer based at least in part on a fuel capacity of the vehicle and a flow rate of the fuel pump. Such examples can further include adjusting the flow rate of the fuel pump to cause the vehicle to be fueled up in a time commensurate with the playback duration of the media content. For example, adjusting the flow rate of the fuel pump can include increasing the flow rate of the fuel pump when the fuel-up time is longer than the playback duration of the media content and/or decreasing the flow rate of the fuel pump when the fuel-up time is shorter than the playback duration of the media content. In examples, determining the estimated duration is based at least in part on customer data stored in the profile database 416.

At block 606, the media content delivery engine 412 presents media content to the customer that has a playback duration commensurate with the estimated duration that the customer is expected to be in proximity to the kiosk. The media content can be selected from a plurality of media content stored in a media content database, and the plurality of media content can have various playback durations associated therewith. The media content can also be selected based on the customer data stored in the profile database to provide customized, consumer-specific content to a particular customer.

Additional processes also may be included. For example, the media content delivery engine 412 can modify the media content prior to or during the presenting to cause the playback duration of the media content to be commensurate with the estimated duration. According to examples, modifying the media content can include presenting the media content at a faster playback speed than a standard playback speed when it is determined that the playback duration of the media content is longer than the estimated duration. In one or more examples, an adjustable percentage difference threshold can be implemented such that the media content does not become so distorted that it is not understandable. For example, if the media content is 100 seconds and the user is estimated to be at the kiosk for 80 seconds and the threshold is 25% of the estimated playback time, the percent difference threshold is met because the media content could be played at 1.25× speed to fit within the 80 seconds. However, content longer than 100 seconds would have to be played too fast to fit within the 80 seconds and would thus violate the percentage difference threshold and would not be suitable for playing because it may not be understood by the user. According to other examples, modifying the media content can include presenting the media content at a slower playback speed than a standard playback speed when it is determined that the playback duration of the media content is shorter than the estimated duration.

It should be understood that the processes depicted in FIG. 6 represent an illustration and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for predictive media content delivery, the method comprising:
    determining, by a processing device, whether a customer approaching a kiosk can be identified;
    responsive to determining that the customer approaching the kiosk can be identified,
        identifying, by the processing device, the customer approaching a kiosk as an identified customer, wherein the kiosk is a fuel kiosk comprising a fuel pump; and
        determining, by the processing device, an estimated duration that the identified customer is expected to be in proximity to the kiosk, wherein determining the estimated duration that the identified customer is expected to be in proximity to the kiosk comprises determining an estimated fuel-up time for a vehicle associated with the identified customer based at least in part on a fuel capacity of the vehicle and a flow rate of the fuel pump, wherein the fuel capacity of the vehicle is determined by identifying a make and a model of the vehicle using image recognition;
    responsive to determining that the customer approaching the kiosk cannot be identified, designating the customer as an unidentified customer and making an assumption about how long the unidentified customer will be at the kiosk to determine an estimated duration that the unidentified customer is expected to be in proximity to the kiosk;
    presenting, by the processing device, media content to the identified customer or the unidentified customer, the media content having a playback duration commensurate with the estimated duration that the identified customer is expected to be in proximity to the kiosk or that has a playback duration commensurate with the estimated duration that the unidentified customer is expected to be in proximity to the kiosk; and
    modifying the media content prior to or during the presenting to cause the playback duration of the media content to be commensurate with the estimated duration that the identified customer is expected to be in proximity to the kiosk or that has a playback duration commensurate with the estimated duration that the unidentified customer is expected to be in proximity to the kiosk, wherein modifying the media content comprises:
        causing the media content to be presented at a faster playback speed than a standard playback speed responsive to determining that the playback duration of the media content is longer than the estimated duration that the identified customer is expected to be in proximity to the kiosk or that has a playback duration commensurate with the estimated duration that the unidentified customer is expected to be in proximity to the kiosk, or
        causing the media content to be presented at a slower playback speed than the standard playback speed responsive to determining that the playback duration of the media content is shorter than the estimated duration that the identified customer is expected to be in proximity to the kiosk or that has a playback duration commensurate with the estimated duration that the unidentified customer is expected to be in proximity to the kiosk; and
    saving, for a threshold period of time, data about the unidentified customer, the data comprising information about an actual amount of time the unidentified customer was at the kiosk and which media content was delivered to the unidentified customer.

2. The computer-implemented method of claim 1, further comprising adjusting the flow rate of the fuel pump to cause the vehicle to be fueled up in a time commensurate with the playback duration of the media content.

3. The computer-implemented method of claim 2, wherein adjusting the flow rate of the fuel pump comprises increasing the flow rate of the fuel pump when the estimated fuel-up time is longer than the playback duration of the media content.

4. The computer-implemented method of claim 2, wherein adjusting the flow rate of the fuel pump comprises decreasing the flow rate of the fuel pump when the estimated fuel-up time is shorter than the playback duration of the media content.

5. The computer-implemented method of claim 1, wherein identifying the customer comprises identifying the customer using an identifier associated with the customer, wherein the identifier is stored in a profile database.

6. The computer-implemented method of claim 5, wherein determining the estimated duration that the identified customer is expected to be in proximity to the kiosk is based at least in part on customer data stored in the profile database.

7. The computer-implemented method of claim 6, wherein the media content is selected from a plurality of media content based at least in part on the customer data stored in the profile database.

8. The computer-implemented method of claim 1, wherein the media content is selected from a plurality of media content stored in a media content database, and wherein the plurality of media content have various playback durations associated therewith.

9. The computer-implemented method of claim 1, further comprising adjusting operation of a task being performed on or near the kiosk to cause the task to occur in a time commensurate with the playback duration of the media content.

10. A system comprising:
a memory comprising computer readable instructions; and
a processing device for executing the computer readable instructions for performing a method for predictive media content delivery, the method comprising:
determining, by the processing device, whether a customer approaching a kiosk can be identified;
responsive to determining that the customer approaching the kiosk can be identified,
identifying, by the processing device, the customer approaching a kiosk as an identified customer, wherein the kiosk is a fuel kiosk comprising a fuel pump; and
determining, by the processing device, an estimated duration that the identified customer is expected to be in proximity to the kiosk, wherein determining the estimated duration that the identified customer is expected to be in proximity to the kiosk comprises determining an estimated fuel-up time for a vehicle associated with the identified customer based at least in part on a fuel capacity of the vehicle and a flow rate of the fuel pump, wherein the fuel capacity of the vehicle is determined by identifying a make and a model of the vehicle using image recognition;
responsive to determining that the customer approaching the kiosk cannot be identified, designating the customer as an unidentified customer and making an assumption about how long the unidentified customer will be at the kiosk to determine an estimated duration that the unidentified customer is expected to be in proximity to the kiosk;
presenting, by the processing device, media content to the identified customer or the unidentified customer that has a playback duration commensurate with the estimated duration that the identified customer is expected to be in proximity to the kiosk or that has a playback duration commensurate with the estimated duration that the unidentified customer is expected to be in proximity to the kiosk; and
modifying the media content prior to or during the presenting to cause the playback duration of the media content to be commensurate with the estimated duration that the identified customer is expected to be in proximity to the kiosk or that has a playback duration commensurate with the estimated duration that the unidentified customer is expected to be in proximity to the kiosk, wherein modifying the media content comprises:
causing the media content to be presented at a faster playback speed than a standard playback speed responsive to determining that the playback duration of the media content is longer than the estimated duration that the identified customer is expected to be in proximity to the kiosk or that has a playback duration commensurate with the estimated duration that the unidentified customer is expected to be in proximity to the kiosk, or
causing the media content to be presented at a slower playback speed than the standard playback speed responsive to determining that the playback duration of the media content is shorter than the estimated duration that the identified customer is expected to be in proximity to the kiosk or that has a playback duration commensurate with the estimated duration that the unidentified customer is expected to be in proximity to the kiosk; and
saving, for a threshold period of time, data about the unidentified customer, the data comprising information about an actual amount of time the unidentified customer was at the kiosk and which media content was delivered to the unidentified customer.

11. The system of claim 10, wherein the method further comprises adjusting the flow rate of the fuel pump to cause the vehicle to be fueled up in a time commensurate with the playback duration of the media content.

12. A computer program product comprising:
a computer readable storage medium having program instructions embodied therewith, the program instructions executable by a processing device to cause the processing device to perform a method for predictive media content delivery, the method comprising:
determining, by the processing device, whether a customer approaching a kiosk can be identified;
responsive to determining that the customer approaching the kiosk can be identified,
identifying, by the processing device, the customer approaching a kiosk as an identified customer, wherein the kiosk is a fuel kiosk comprising a fuel pump; and
determining, by the processing device, an estimated duration that the identified customer is expected to be in proximity to the kiosk, wherein determining the estimated duration that the identified customer is expected to be in proximity to the kiosk comprises determining an estimated fuel-up time for a vehicle associated with the identified customer based at least in part on a fuel capacity of the vehicle and a flow rate of the fuel pump, wherein the fuel capacity of the vehicle is determined by identifying a make and a model of the vehicle using image recognition;

responsive to determining that the customer approaching the kiosk cannot be identified, designating the customer as an unidentified customer and making an assumption about how long the unidentified customer will be at the kiosk to determine an estimated duration that the unidentified customer is expected to be in proximity to the kiosk;

presenting, by the processing device, media content to the identified customer or the unidentified customer that has a playback duration commensurate with the estimated duration that the identified customer is expected to be in proximity to the kiosk or that has a playback duration commensurate with the estimated duration that the unidentified customer is expected to be in proximity to the kiosk; and modifying the media content prior to or during the presenting to cause the playback duration of the media content to be commensurate with the estimated duration that the identified customer is expected to be in proximity to the kiosk or that has a playback duration commensurate with the estimated duration that the unidentified customer is expected to be in proximity to the kiosk, wherein modifying the media content comprises:

causing the media content to be presented at a faster playback speed than a standard playback speed responsive to determining that the playback duration of the media content is longer than the estimated duration that the identified customer is expected to be in proximity to the kiosk or that has a playback duration commensurate with the estimated duration that the unidentified customer is expected to be in proximity to the kiosk, or causing the media content to be presented at a slower playback speed than the standard playback speed responsive to determining that the playback duration of the media content is shorter than the estimated duration that the identified customer is expected to be in proximity to the kiosk or that has a playback duration commensurate with the estimated duration that the unidentified customer is expected to be in proximity to the kiosk; and saving, for a threshold period of time, data about the unidentified customer, the data comprising information about an actual amount of time the unidentified customer was at the kiosk and which media content was delivered to the unidentified customer.

* * * * *